United States Patent

[11] 3,619,679

| [72] | Inventor | Thomas F. Carmichael<br>Drayton Plains, Miss. |
|---|---|---|
| [21] | Appl. No. | 27,270 |
| [22] | Filed | Apr. 10, 1970 |
| [45] | Patented | Nov. 9, 1971 |
| [73] | Assignee | Syncro Corporation<br>Oxford, Mich. |

[54] GENERATOR STRUCTURE
10 Claims, 4 Drawing Figs.

[52] U.S. Cl. ................................................. 310/159,
310/67, 310/741, 310/156, 310/263
[51] Int. Cl. ................................................. H02k 17/00
[50] Field of Search ........................................... 310/159,
67, 74, 263, 266, 257, 153, 154, 156, 266, 168

[56] References Cited
UNITED STATES PATENTS
1,890,898  12/1932  Beeh ........................... 310/153

| 3,140,413 | 7/1964 | Terry | 310/74 |
| 3,184,625 | 5/1965 | Farison | 310/263 |
| 3,215,877 | 11/1965 | Raver | 310/263 |
| 3,493,800 | 2/1970 | Barrett | 310/263 |

*Primary Examiner*—D. F. Duggan
*Assistant Examiner*—R. Skudy
*Attorney*—Harness, Dickey & Pierce ABSTRACT: A generator having a pair of armature bodies with interdigitating fingers on each of the armature bodies defining magnetic poles of opposite polarity with one of the armature bodies being a preexisting rotary member such as a flywheel and with the other armature body being a separate fabricated member nested in the one member and with the fingers of each extending in the same axial direction.

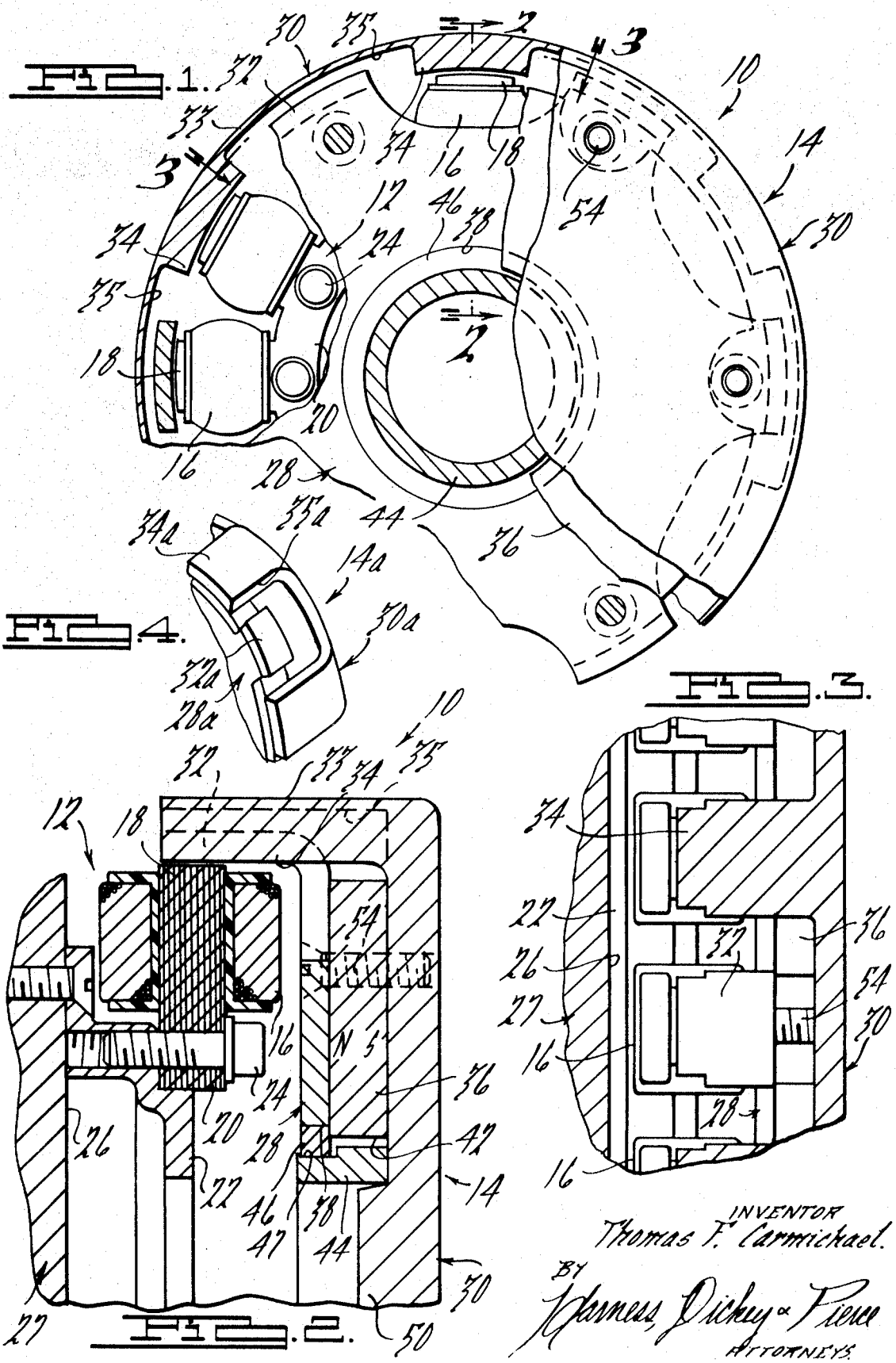

GENERATOR STRUCTURE

SUMMARY - BACKGROUND OF THE INVENTION

The present invention relates to generator constructions.

In structures using armatures having fingers defining poles, the armatures are usually mounted with the fingers of one extending axially towards the other armature. In many cases the field winds are located between the armatures thereby requiring sliprings; in addition the stator output windings, are circumferentially disposed and must be located concentrically with the armature fingers. In the present invention the armature bodies are nested with the fingers of each extending in the same axial direction; at the same time, the stator and output windings are located externally of the armature bodies but proximate to the fingers. By use of a permanent magnet to provide the field, this structure does not require sliprings. With this general structure, one of the armature bodies can be a preexisting structure such as a flywheel, ring gear, etc., thereby resulting in a simple inexpensive assembly. In addition the general structural arrangement readily permits location of the stator and load windings either radially inwardly or radially outwardly of the fingers. Therefore it is an object of the present invention to provide a new and improved generator structure having armature bodies with interdigitating fingers and constructed such that sliprings are not required with one of the armature bodies being a preexisting structure such as a flywheel. It is another general object of the present invention to provide a new and improved generator construction.

Other objects, features, and advantages of the present invention will become apparent from the subsequent description and the appended claims, taken in conjunction with the accompanying drawing, in which:

FIG. 1 is a fragmentary, front elevational view of a generator assembly embodying features of the present invention with some parts broken away;

FIG. 2 is a sectional view of the assembly of FIG. 1 taken generally along the line 2—2;

FIG. 3 is a view taken generally in the direction of the arrows 3—3; and

FIG. 4 is a fragmentary, pictorial view to reduced scale, of a modified form of rotor.

The alternator assembly is generally indicated by the numeral 10 and includes a stator assembly 12 and a rotor assembly 14. The stator assembly includes a plurality of output or load windings 16 wound upon a plurality of poles 18 which are a part of and extend radially outwardly from a ring 20. The ring 20 with its poles 18 is a laminated structure made of a ferrous material having a low magnetic reluctance. The stator ring 20 is secured to an aluminum mounting ring 22 via a plurality of bolts 24. The mounting ring 22 in turn is adapted to be mounted to a suitable mounting surface 26 on an engine 27 (only generally shown). A flywheel 30 is connected with the engine 27 in a conventional manner.

The rotor assembly 14 includes a pair of armature members one of which is a generally flat member 28 and the other of which is the flywheel 30 which is a preexisting structure adapted to be rotated by the engine. The flat member 28 has a plurality of radial fingers 32 which are bent to extend axially. The flywheel 30 has an outer rim 33 in which are cast, or otherwise formed a plurality of axially extending and radially inwardly extending projections or fingers 34 defined by alternate slots 35. The fingers 32 and 34 are equally, circumferentially disposed and the armature 28 is nested within the flywheel 30 so that the fingers 32 extend in the same axial direction as the fingers 34. The armature 28 and flywheel 30 are indexed relative to each other, however, so that the fingers 32 and 34 are interdigitated with each other. An annular, permanent magnet 36 is sandwiched in between and in contact with the armature 28 and flywheel 30 and has its north and south poles oriented in the manner shown in FIG. 2. The magnet 36 is preferably a ceramic magnet of the barium ferrite type. This type of ceramic magnet material can be shallow while still providing a high-coercive and in contrast to an Alnico magnet of the same coercive force, the ceramic magnet can be thinner resulting in a more compact structure. The flat armature 28 has a bore 38 which is coaxial with the central bore 42 in magnet 36. A support ring 46 is located in bore 38 and on a small diameter shoulder 47 on a pilot ring 44. The magnet 36 is clamped between radial surfaces of the ring 46 and the flywheel 30 by an upturned lip 48.

The pilot ring 44 is adapted to pilot upon an axially extending hub 50 of the flywheel 30 to thereby properly radially locate the armature body 28. In addition, the armature body 28 is fixed to the flywheel 30 for rotation therewith by brass screws 54. The fingers 34 are longer than fingers 32 so that their outer ends are generally in axial alignment and both are located slightly radially outwardly from but in alignment with the poles 18 on stator assembly 12. The flat armature 28 and flywheel — armature 30 are made of ferrous materials having a low magnetic reluctance while the pilot ring 44 and ring 46 are made of aluminum which has a high reluctance. Thus the main path for magnetic flux from magnet 36 will be through armature 28, fingers 32, some of the poles 18, the body of ring 20, the others of the poles 18, fingers 34 and flywheel armature 30 back to magnet 36.

The above construction is compact and economical. Notice that it readily fits in the space which normally exists between the flywheel and adjacent face of the engine. Also with the design as shown since the flywheel 30 performs the dual function of flywheel and armature only one separate armature 28 need be made and that can be made of inexpensive sheet steel. The total result is a generally inexpensive structure.

A slightly modified form of the invention is shown in FIG. 4. In FIG. 4 only the rotor assembly has been shown and components which are similar to like parts in the embodiment of FIGS. 1–3 have been given the same numerical designation with the addition of the letter postscript "a." The rotor assembly 14a is identical to assembly 14 except that the slots 35a are through slots whereby the fingers 34a are free of one another and are not interconnected by a continuous rim portion. With this structure the stator assembly can be located either radially inwardly or outwardly relative to the fingers. Of course, with either construction (FIGS. 1–3 or 4) when a permanent magnet is used no sliprings are required.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An electrical generator for an engine comprising: a stator assembly having a plurality of circumferentially disposed poles, a rotor assembly having a first plurality of axially extending fingers interdigitated with a second plurality of axially extending fingers with said first and second pluralities of fingers extending in the same axial direction towards said poles, said rotor assembly including magnet means comprising a permanent magnet for providing magnetic flux of opposite polarities to said first and second pluralities of fingers, said second plurality of fingers being formed integrally with a preexisting structure performing an independent function with the engine and being adapted to be rotated by the engine.

2. The generator of claim 1 with said rotor assembly including an armature having said first plurality of fingers and being constructed of flat sheet stock.

3. An electrical generator for an engine comprising: a stator assembly having a plurality of circumferentially disposed poles, a rotor assembly having a first plurality of axially extending fingers interdigitated with a second plurality of axially extending fingers with said first and second pluralities of fingers extending in the same axial direction towards said poles, said rotor assembly including magnet means for providing magnetic flux of opposite polarities to said first and second pluralities of fingers, said second plurality of fingers being formed integrally with a preexisting structure performing an independent function with the engine and being adapted to be rotated by the engine, said rotor assembly including an armature having said first plurality of fingers and being constructed of flat sheet stock, said magnet means comprising a permanent magnet located between said armature and said preexisting structure.

4. The generator of claim 3 with said preexisting structure being a flywheel and including first means mounting said armature and said magnet on said flywheel and second means mounting said stator assembly on an adjacent surface of the engine.

5. The generator of claim 4 with said flywheel having a hub portion and with said first means comprising a pilot ring cooperating with said hub portion to properly locate said armature.

6. The generator of claim 1 with said preexisting structure being a flywheel.

7. The generator of claim 6 with said flywheel having an annular rim and with said second plurality of fingers being defined by axially extending grooves extending only partially radially through said rim.

8. The generator of claim 6 with said flywheel having said first plurality of fingers defined by axially extending radial through slots whereby said first plurality of fingers are circumferentially separate.

9. The generator of claim 1 with said preexisting structure being a cast flywheel and with said second plurality of fingers being integrally cast with said flywheel.

10. The generator of claim 4 with said flywheel being a cast structure and with said second plurality of fingers being integrally cast with said flywheel.

* * * * *